March 19, 1935.  W. D. BELLAMY  1,995,088
AUTOMOBILE BUMPER
Filed April 27, 1934  2 Sheets-Sheet 1

Inventor

W. D. Bellamy

By Clarence A. O'Brien
Attorney

March 19, 1935.  W. D. BELLAMY  1,995,088
AUTOMOBILE BUMPER
Filed April 27, 1934  2 Sheets-Sheet 2
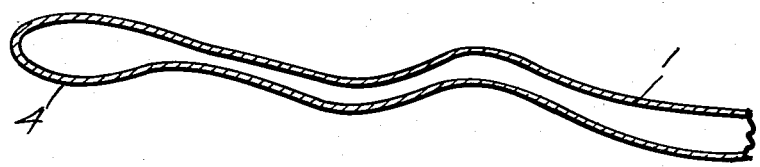
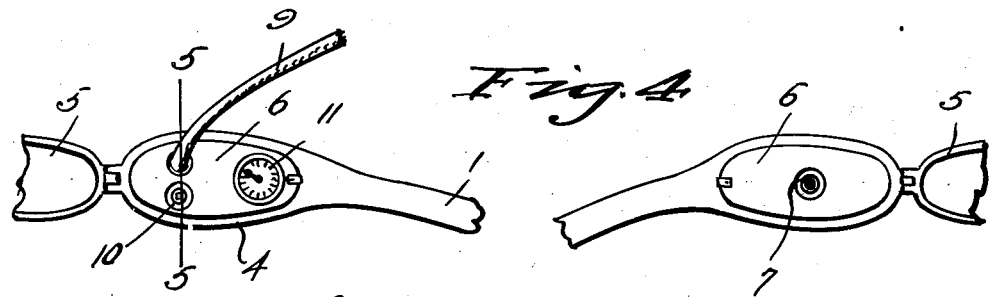
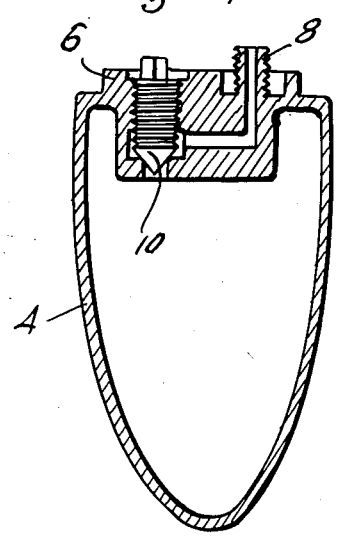
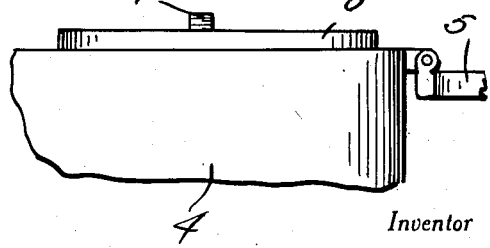
Inventor
W. D. Bellamy
By Clarence A. O'Brien
Attorney Patented Mar. 19, 1935

1,995,088

UNITED STATES PATENT OFFICE 1,995,088

AUTOMOBILE BUMPER

William D. Bellamy, Henderson, Tex., assignor of one-half to Ollie T. Brightwell, Henderson, Tex.

Application April 27, 1934, Serial No. 722,785

3 Claims. (Cl. 293—55)

The present invention relates to new and useful improvements in automobile bumpers and has for its primary object to provide, in a manner as hereinafter set forth, a device of this character which is adapted to carry a supply of air under pressure for inflating the tires of the automobile when necessary.

Another important object of the invention is to provide an automobile bumper which is adapted to contain a supply of compressed air and which includes novel means for connecting a supply hose of the type in widespread use at service stations thereto and also for connecting a delivery hose, which may be carried in the car, thereto.

Other objects of the invention are to provide an automobile bumper of the character described which will be simple in construction, strong, durable, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a view in horizontal section, taken substantially on the line 3—3 of Figure 1.

Figure 4 is a view in top plan of the bumper with the intermediate portion thereof broken away, the hinged covers being in open position and showing an inflating hose connected to one end thereof.

Figure 5 is a vertical sectional view, taken substantially on the line 5—5 of Figure 4.

Figure 6 is a fragmentary view in front elevation of a portion of the end of the bumper to which the pressure hose is connected.

Figure 1:
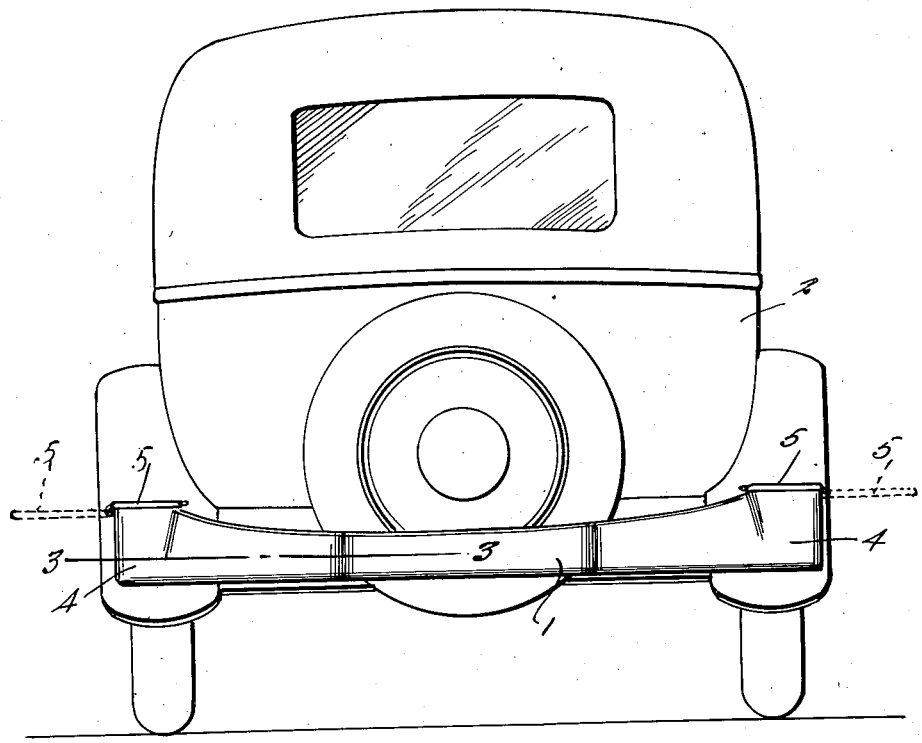
Figure 1 is a view in front elevation of a bumper constructed in accordance with the present invention, showing the same mounted on the rear of an automobile.
Figure 2:
Figure 2 is a view in top plan of the invention.

Referring now to the drawings in detail, it will be seen that the embodiment of the invention which has been illustrated comprises a hollow bar 1 of suitable metal which is mounted on the automobile 2 through the medium of the supporting members 3. The bar 1 is provided with enlarged, closed end portions 4 upon which hinged covers 5 are mounted. The tops of the end portions 4 are substantially flat and thickened, as at 6. Mounted in one of the end portions 4 of the bumper 1 is a conventional valve 7 of the Schrader type. The other end portion 4 of the bar 1 is provided with a threaded nipple 8 or connection with an inflating hose 9 which may be carried in the automobile when not in use. The discharge of the air from the bar 1 is controlled by a needle valve 10 which, as illustrated to advantage in Figure 5 of the drawings, is threadedly mounted in the bumper. The reference numeral 11 designates a pressure gauge.

In use, air under pressure may be stored in the hollow bar 1 by engaging the nozzle of a conventional tire inflating hose at a service station with the valve 7, as is believed to be apparent. When it is desired to use the air in the hollow bar 1, the hose 9 is connected to the nipple 8 and the valve 10 is opened for permitting the escape of the air. Of course, the hose 9 is long enough to reach any of the tires on the automobile. When not in use the covers 5 conceal and protect the elements 7, 8, 10 and 11. If desired, any suitable latching or locking means may be provided for the hinged covers 5.

It is believed that the many advantages of an automobile bumper constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. An automobile bumper of the class described comprising, in combination, a hollow, closed bar for the reception of compressed air, valved means on one end portion of the bar for connection with a supply conduit for injecting the air under pressure thereinto, and valve controlled means on the other end portion of the bar for connecting a conduit thereto for inflating the tires of the automobile.

2. An automobile bumper of the class described comprising a hollow bar for the reception of compressed air, said bar including enlarged end portions, a valve on one of said enlarged end portions for connecting a supply hose thereto for injecting the air under pressure into the bar, and valve controlled means on the other enlarged end portion for connecting a conduit to the bar for inflating the tires of the automobile.

3. An automobile bumper of the class described comprising, in combination, a hollow, closed bar for the reception of compressed air, valved means on one end portion of the bar for connecting a supply hose thereto for injecting the air under pressure, valve controlled means on the other end portion of the bar for connecting a conduit thereto for inflating the tires of the automobile, and covers hingedly mounted on the ends of the bar for concealing and protecting the first and second named means.

WILLIAM D. BELLAMY.